United States Patent [19]

Pettit et al.

[11] Patent Number: 5,204,161

[45] Date of Patent: Apr. 20, 1993

[54] FABRICATION OF PANEL STRUCTURE

[75] Inventors: Richard G. Pettit, La Habra; Ken K. Yasui, Huntington Beach, both of Calif.

[73] Assignee: McDonnell Douglas Corporation, Long Beach, Calif.

[21] Appl. No.: 709,695

[22] Filed: Jun. 3, 1991

[51] Int. Cl.$^5$ .................. B32B 3/12; F04C 2/34
[52] U.S. Cl. ........................ 428/174; 428/72; 428/178; 428/179; 428/182; 428/184; 428/185; 428/188; 52/785; 52/799; 52/806; 52/811; 244/119; 228/157
[58] Field of Search ............... 428/182, 185, 178, 174, 428/72, 76, 120, 179, 184, 188; 181/288, 290; 52/785, 795, 799, 806, 811; 244/117 R, 119, 123; 228/157

[56] References Cited

U.S. PATENT DOCUMENTS 3,193,434 7/1965 Weiss ................... 428/178
3,574,103 4/1971 Latkin .................. 428/185

Primary Examiner—Donald J. Loney
Attorney, Agent, or Firm—Max Geldin

[57] ABSTRACT

The structure and process for making a metallic panel structure from a plurality of core panels each comprised of a pair of sheets of superplastic material welded together along a plurality of weld lines. The core panels are joined together, with the weld lines of one core panel positioned normal to the weld lines of the adjacent core panel. The resulting assembly is placed in a die. The die is heated to superplastic forming temperature, and gas pressure is applied to the spaces between the sheets of the respective core panels, causing superplastic forming and expansion of the sheets of each core panel to form a series of bulges between weld lines of one core panel, and a series of similar bulges between weld lines of the adjacent core panel, the bulges expanding inwardly toward each other. The two series of bulges are orthogonally disposed, the bulges from the two core panels contacting and forming around each other. Further pressurization is applied to cause diffusion bonding at the contacting areas of the two series of bulges. The resulting structure is formed of two normally disposed series of bulges, with face sheets connected to such bulges. According to another embodiment, three core panels can be employed, resulting in a structure following superplastic forming and diffusion bonding, formed of two outer series of inwardly extending parallel bulges and an intermediate series of bulges between the two series of outer bulges.

9 Claims, 7 Drawing Sheets

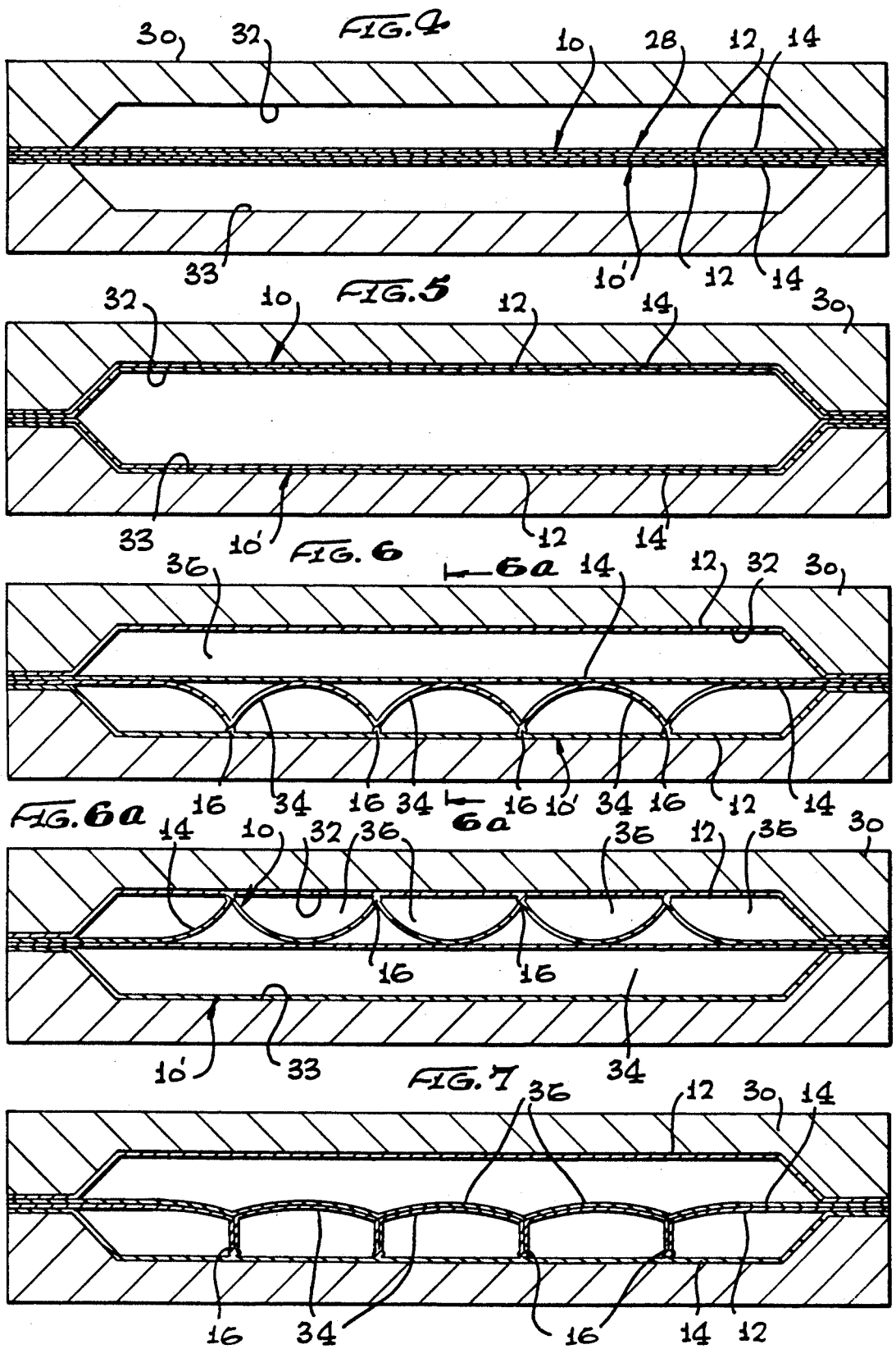

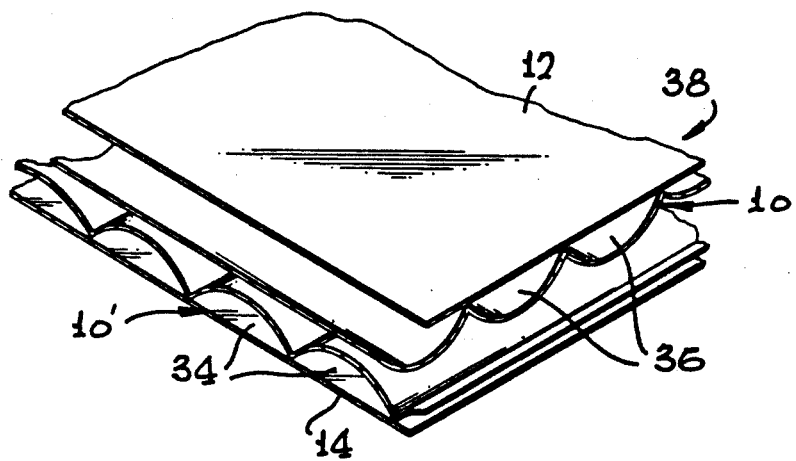
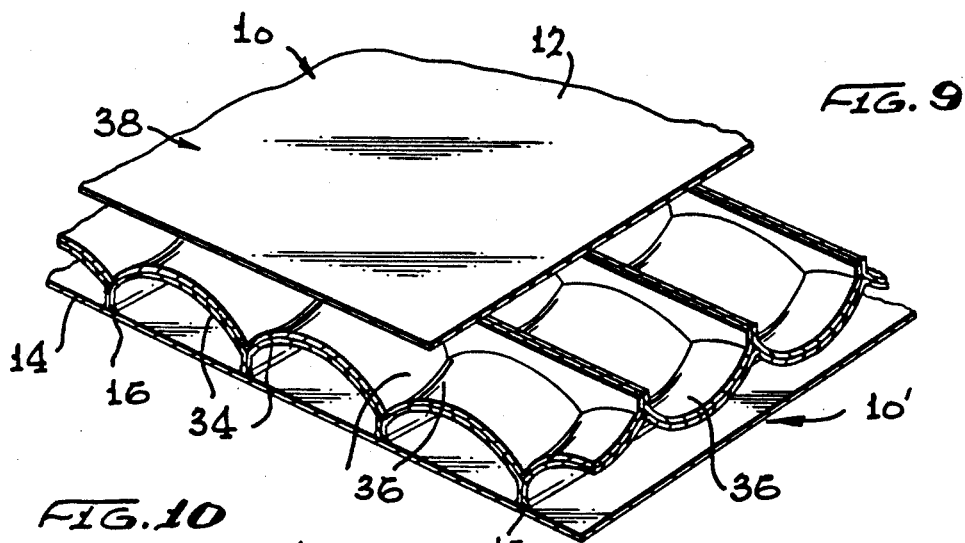
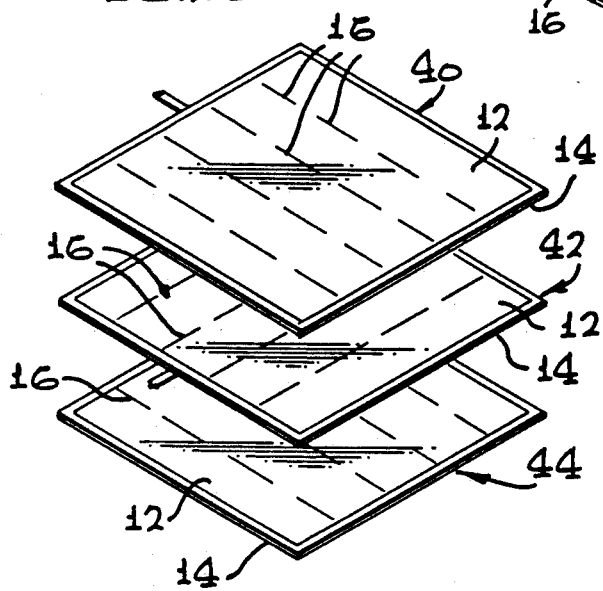
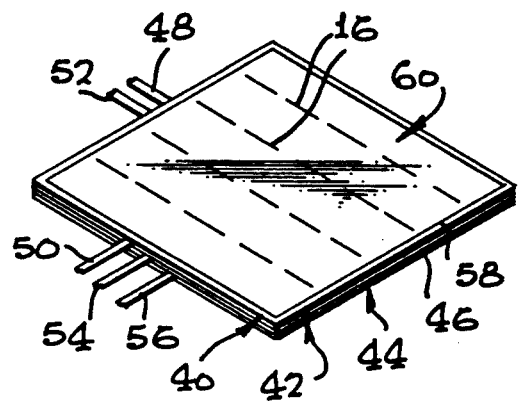

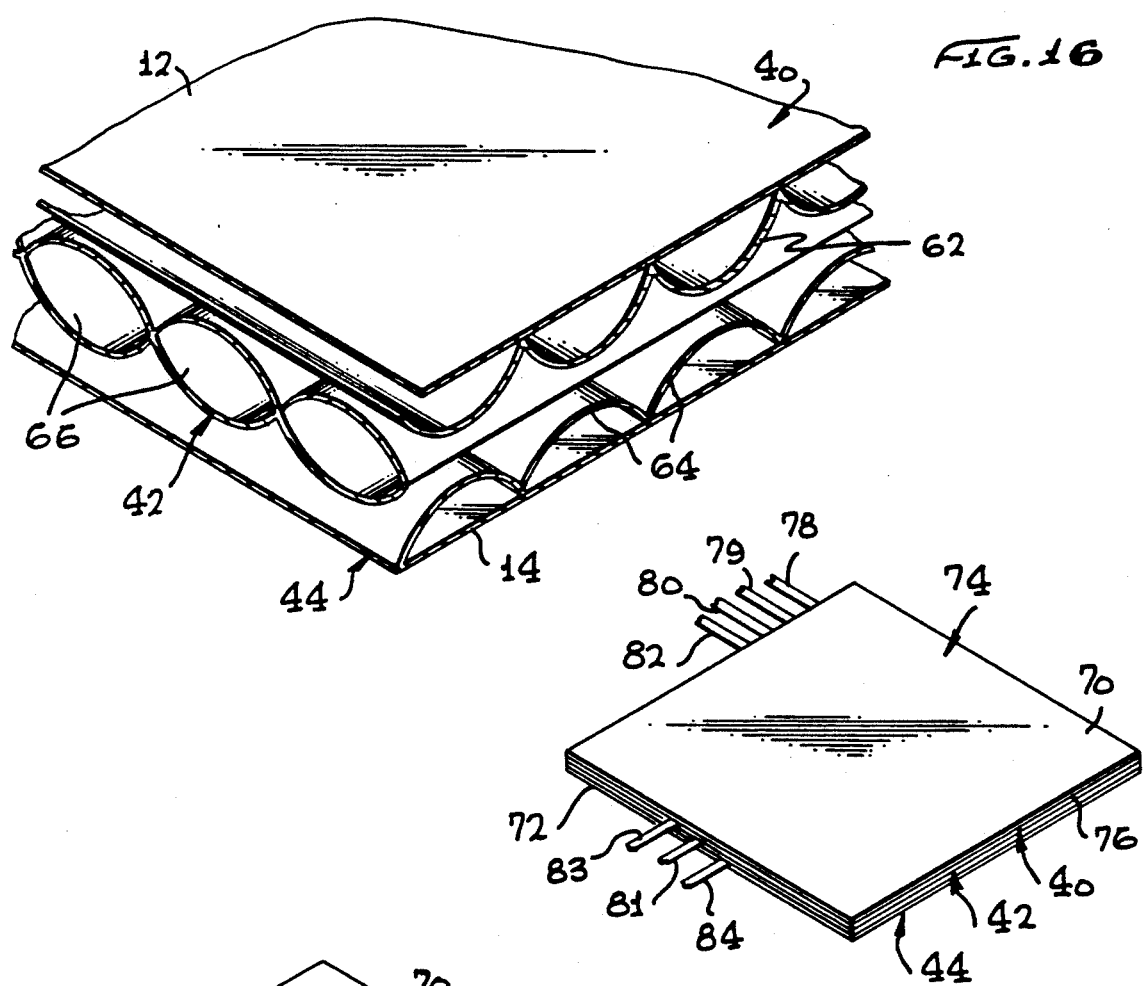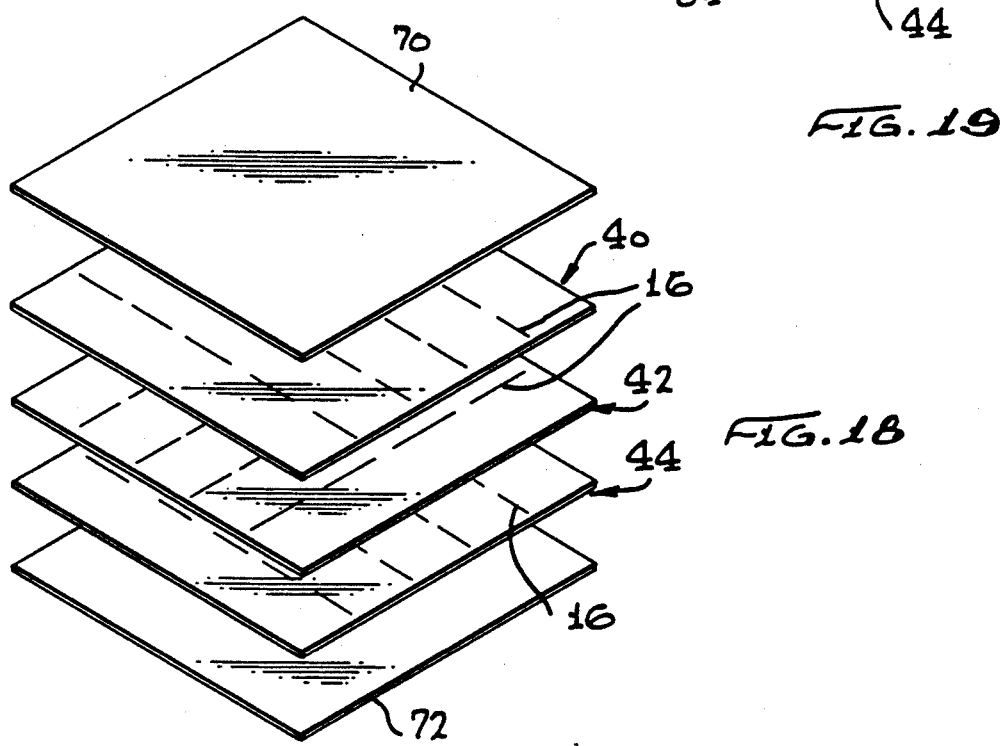

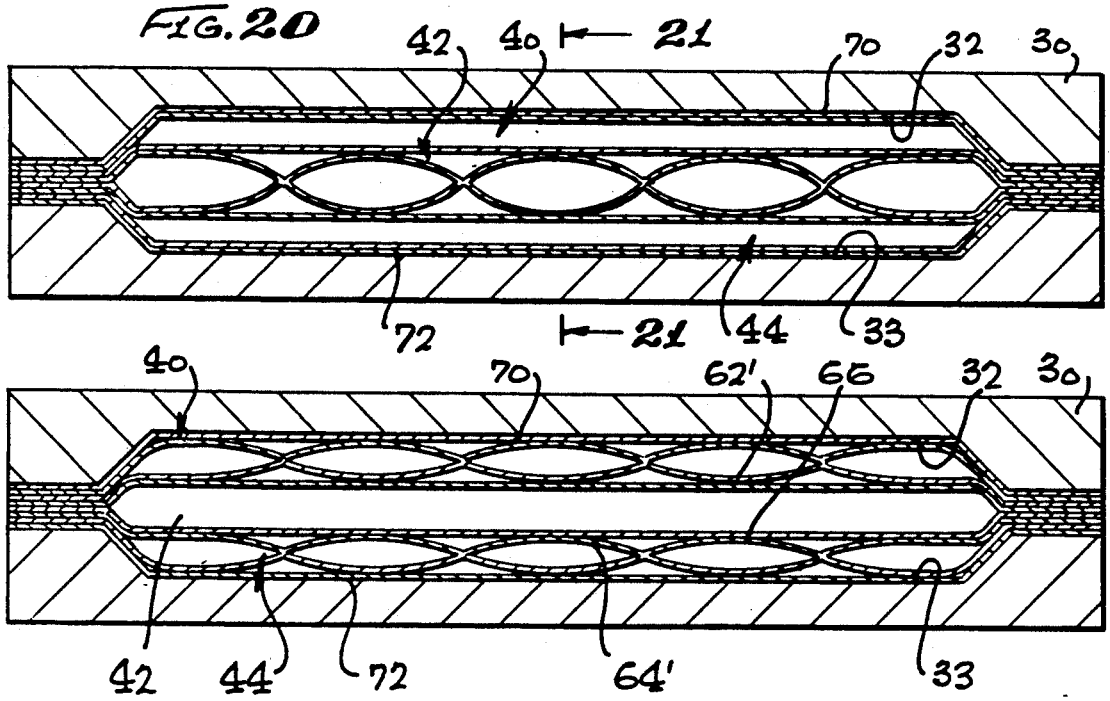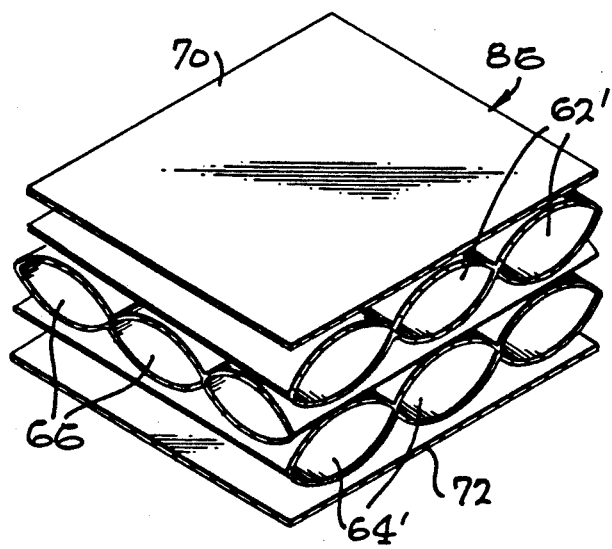

FABRICATION OF PANEL STRUCTURE

BACKGROUND OF THE INVENTION

This invention relates to the production of superplastically formed metal alloy panel structures, and is more particularly directed to the production of superplastically formed and diffusion bonded metal panel or sandwich structures, and the procedure for producing such structures.

Superplasticity is the characteristic demonstrated by certain metals to develop unusually high tensile elongations with minimum necking when deformed within a limited temperature and strain rate range. This characteristic, peculiar to certain metal and metal alloys has been known in the art as applied to the production of complex shapes. It is further known that at these same superplastic forming temperatures the same materials can be diffusion bonded with the application of pressure at contacting surfaces.

Diffusion bonding refers to the solid-state, metallurgical joining of surfaces of similar or dissimilar metals by applying heat and pressure for a time duration so as to effect intimate surface contact and cause comingling of atoms at the joint interface.

U.S. Pat. No. 4,304,821 to Hayase, et al discloses the structure and the process for making a metallic sandwich structure or box section panel in which metal worksheets, preferably made from titanium alloy, are joined in a preselected pattern by an intermittent or discontinuous weld. The joined sheets are sealed by a continuous weld to form an expandable envelope. Application of inert gas pressure to the envelope in a limiting fixture superplastically produces the sandwich structure as the expanded structure diffusion bonds to itself or other worksheets. Core configuration of the structure is determined by the weld pattern.

It is an object of the present invention to provide an improved panel structure or sandwich structure by superplastic forming and diffusion bonding.

Another object is the provision of a stiffened, lightweight panel structure with good resistance to bending, shear and buckling.

A further object is to provide improved stiffened panel structures having the aforementioned characteristics, formed from four to eight workpieces or sheets.

Yet another object is the provision of superplastic forming and diffusion bonding procedure for producing the improved stiffened panel structures or sandwiched panels of the invention.

Other objects and advantages of the invention will appear hereinafter.

SUMMARY OF THE INVENTION

Briefly, the present invention provides a metallic panel or sandwich structure and a method for producing same from a plurality of metal core elements or core panels comprised of superplastic material. By the term "superplastic material" employed herein is meant materials having the aforementioned superplasticity characteristics. Each core panel is formed of a pair of metal sheets, each of the sheets comprised of a superplastic material. The sheets are welded together along a plurality of parallel weld lines leaving spaces to permit free passage of gas between the sheets throughout the core panel.

A pair of the core panels are joined together with the weld lines of one core panel positioned normal to the weld lines of the other core panel. The perimeter of the joined core panels are sealed and the resulting assembly is placed in a die. The die is heated to superplastic forming temperature, and gas pressure is applied to the spaces between the sheets of the respective core panels, causing superplastic forming and expansion of the sheets of each core panel to form a series of bulges between weld lines of one core panel and a series of similar bulges between weld lines of the adjacent core panel, the bulges expanding inwardly toward each other. Thus, two series of bulges from the adjacent core panels are produced which are orthogonally disposed and extend toward each other. The bulges from the two core panels first contact each other and then further expand and form around each other. During such expansion further pressurization is applied to cause the oppositely disposed bulges to diffusion bond together at the contacting areas. The result is a four-sheet panel structure formed of the two normally disposed series of bulges, with face sheets connected to such bulges, the bulges extending substantially from edge to edge of the core panels.

According to another embodiment, three core panels can be employed, and assembled together, with the weld lines of the first and third outer core panels parallel to each other and the weld lines of the intermediate second core panel disposed normal to the weld lines of the two outer core panels. When this assembly of three core panels are joined together and sealed around the outer periphery, and the resulting assembly subjected to superplastic forming and diffusion bonding as described above, a panel structure is produced having two outer series of inwardly extending parallel bulges and an intermediate series of bulges between the two series of outer bulges, such intermediate series of bulges being disposed normal to the two outer series of bulges. The result is a six-sheet panel structure. In an alternative embodiment, face sheets can be disposed adjacent the two outer series of bulges to form an eight-sheet panel structure.

The result is a stiffened panel structure having improved buckling and shear resistance and good bending resistance. The fabrication of the panel structure of the invention does not require extremely severe forming as in the case of the box section panel of above U.S. Pat. No. 4,304,821 and can thus be constructed of thinner materials having lower strain rate sensitivity. Further, the panel structure of the present invention tends to have more uniform thickness than the above noted prior art box section sandwich panel.

BRIEF DESCRIPTION OF THE DRAWINGS

FIG. 4 is a cross section of a die containing the assembled core elements of FIG. 3;

FIG. 5 illustrates application of pressure between the core elements of FIG. 4, to cause superplastic forming and expansion of the core elements against the walls of the die;

FIG. 6 illustrates application of pressure between the respective sheets of the two core elements, to superplastically form bulges between the weld lines of the respective core elements, the bulges of one core element being positioned normal to and touching the bulges of the other core element;

FIG. 6a is a section taken on line 6a—6a of FIG. 6;

FIG. 7 illustrates formation of the bulges of the two core elements around each other, and diffusion bonded, as result of continued application of pressure and heat to the assembly in the die;

FIG. 8 is a schematic cross section of the assembly in the stage shown in FIGS. 6 and 6a, showing the bulges of the respective core elements extending normal to each other;

FIG. 9 is an isometric partly broken away cross-section of the final superplastically formed and diffusion bonded four-sheet core panel of the invention, at the stage illustrated in FIG. 7;

FIG. 10 is an exploded view of a three core element fabrication assembly for the production of a six-sheet panel structure according to the invention;

FIG. 11 is a perspective view of the three assembled core elements of FIG. 10;

FIG. 16 is a schematic cross-section of the assembly in the stage shown in FIGS. 14 and 14a;

FIG. 18 is an exploded view of an assembly similar to FIG. 10, including three core elements, and also including two face sheets for the production of an eight-sheet panel structure according to the invention;

FIG. 19 is a perspective view of the assembled components of FIG. 18;

FIG. 20 is a view similar to FIG. 14, illustrating application of pressure between the respective core elements of the assembly of FIG. 19, to superplastically form three series of bulges, as in FIGS. 14 and 14a;

FIG. 21 is a section taken on line 21—21 of FIG. 20;

FIG. 22 is a schematic cross section of the assembly in the stage shown in FIGS. 20 and 21.

DETAILED DESCRIPTION OF THE INVENTION AND PREFERRED EMBODIMENTS

As indicated above, the material to be superplastically formed must exhibit the characteristic of high tensile elongation with minimum necking when deformed within a limited temperature and strain rate range. While several materials demonstrate these superplastic properties, titanium and its alloys are currently the best known forming materials. Examples of other metals which have superplasticity characteristics include zirconium, refractory metals, and alloys thereof. Aluminum may also be suitable for this purpose. The superplastic temperature range varies with the specific alloy used. This temperature for titanium alloys is near 1700° F.

In addition to the superplastic properties, the material to be formed according to the invention must be suitable for diffusion bonding. Diffusion bonding temperatures can vary from 1450° F. to about 1850° F., e.g. about 1700° F. for 6A1-4V titanium alloy, and bonding pressure can vary from 100 psi to about 2,000 psi or more, usually from 150 to about 600 psi.

Sandwich panels or panel structures according to the invention are constructed by combining two or more core elements or core panels, as described below. Four, six and eight sheet panels are described, although sandwich panels containing a greater number of sheets can be constructed employing the same basic principles.

Figure 1:
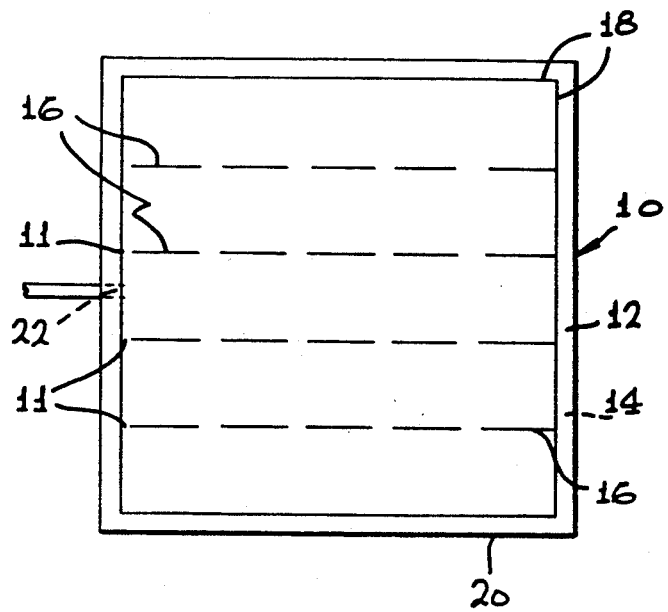
FIG. 1 is a plan view of a core element or core panel formed of a pair of seam welded superplastic metal sheets.
Figure 2:
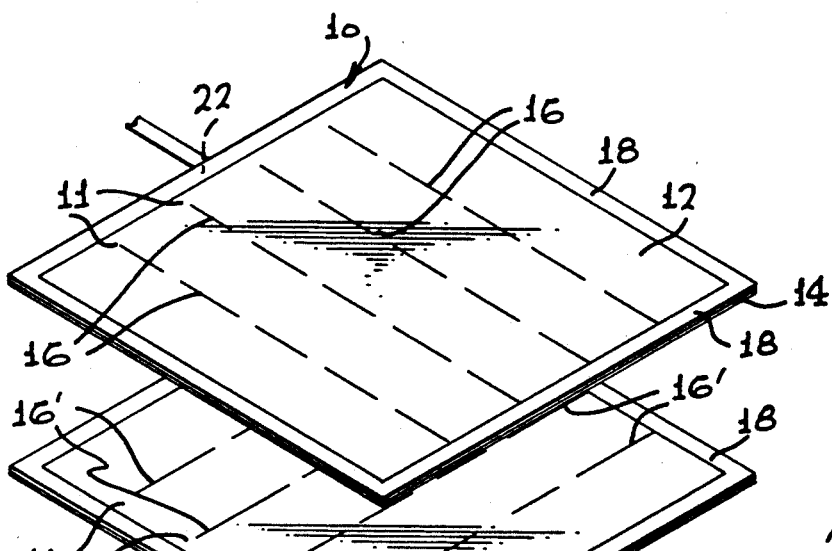
FIG. 2 is an exploded view of a two core element fabrication assembly for the production of a four-sheet panel structure according to the invention.

A four-sheet panel is formed from two core elements or core panels, each of such core elements being illustrated in FIG. 1. The core elements 10 and 10', shown in FIG. 2, are each constructed of two superplastic metallic sheets 12 and 14 seam welded together along a series of parallel weld lines 16. An intermittent roll seam weld along weld lines 16, which is nothing more than a series of spot welds, is the preferred method. However, continuous welds separated by brief weld discontinuities sufficient to create minimum sized vent holes, or passages at the ends of the welds, as at 11, to permit uniform passage of gas to balance the gas pressure between the metal sheets of the core structure during the forming process, can be employed. The two metallic sheets 12 and 14 are also welded at 18 around and adjacent the outer edges of the sheets, leaving a gas inlet at 22.

Figure 3:
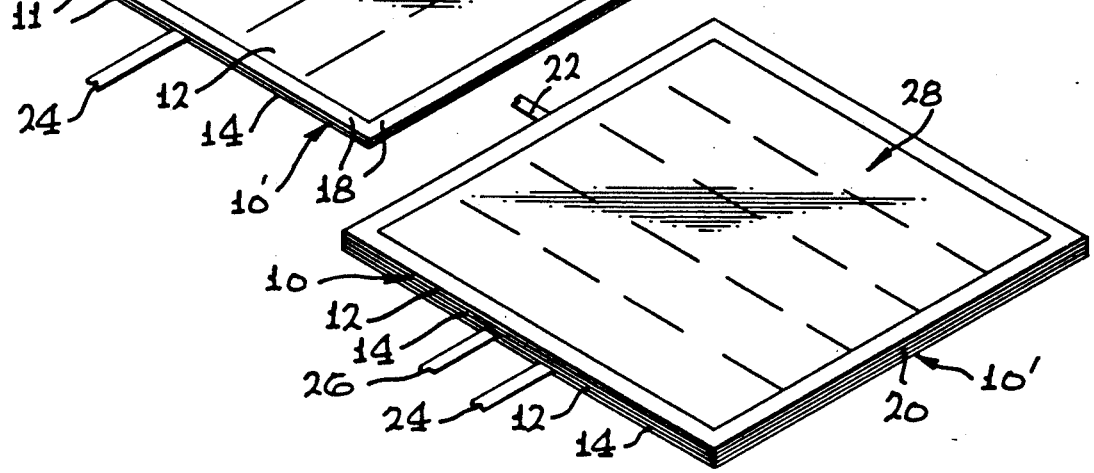
FIG. 3 is a perspective view of the assembled core elements of FIG. 2.

The two core elements 10 and 10' are overlaid, as illustrated in FIG. 2, with the parallel weld lines 16' of core element 10' normal to the parallel weld lines 16 of core element 10. The assembled core elements or panels 10 and 10' are then welded together around the periphery, as indicated at 20 in FIG. 3. The gas inlet 22 provides for passage of gas into the top core element 10, and a gas inlet 24 is provided for introduction of gas into the bottom core element 10', and a gas inlet 26 is provided for introduction of gas into the space between the two core elements 10 and 10'.

The resulting assembly 28 of core elements 10 and 10' are placed in a heated die 30, as illustrated in FIG. 4. Pressure is first applied through gas inlet 26 between the two core elements 10 and 10' to cause superplastic forming and to expand the core elements 10 and 10' against the walls 32, 33 of the die, as seen in FIG. 5. While maintaining sufficient pressure between the core elements 10 and 10' to maintain the outer sheet 12 of core element 10 against the upper wall 32, and the lower sheet 14 of core element 10' against the lower wall 33 of the die cavity, pressure is applied through gas inlets 22 and 24 to the space between the respective sheets 12 and 14 of the two core elements 10 and 10'. Such pressure is higher than the pressure applied at 26 between the core elements, causing superplastic forming and expansion of the upper sheet 12 of lower core element 10' between the parallel weld lines 16 thereof, to form a series of successive bulges 34 between adjacent weld lines 16, as illustrated in FIG. 6. Concurrently with the formation of the bulges 34 of the lower core element 10', superplastic forming and expansion of the lower sheet 14 of the upper core element 10 occurs, forming a series of bulges 6 in core element 10, between the weld lines 16 thereof, as seen in FIG. 6a, the bulges 36 being positioned orthogonally or normal to the bulges 34 of core element 10', until such bulges 36 touch the apex of the bulges 34 (see also FIG. 8). The cores 10 and 10' are continued to be pressurized until the bulges 34 and 36 which are formed inwardly toward each other, form around and in contact with each other, as seen in FIG. 7. During such contact and formation of the upper bulges 36 around the lower bulges 34, the pressure is increased to diffusion bonding pressure, e.g. 200 psi, and under the heat and pressure applied to the interior of the core elements 10 and 10', the contacting areas of the bulges 34 and 36 become diffusion bonded to each other. The resulting panel structure is then removed from the die.

The resulting panel structure or sandwich panel 38 is illustrated in FIG. 9, and is comprised of a series of inwardly extending bulges 34 and a series of inwardly extending bulges 36 contacting and diffusion bonded to the bulges 34, bulges 36 being disposed orthogonally to bulges 34. The bulges 34 and 36 extend in length substantially from edge to edge of core elements 10' and 10, respectively. It will be noted that the outer sheet 12 of core element 10 and the outer sheet 14 of core element 10' which are unformed, constitute outer face sheets of the panel structure. The result is the fabrication of a superplastically formed orthogonal trough bulge sandwich panel comprised of two antisymmetric series of bulges combining to produce a structure of improved buckling, bending and shear resistance.

As an alternative to the four-sheet panel 38 comprised of contacting bulges 34 and 36 and outer face sheets 12 and 14, a six-sheet configuration employing the same structural concept of contacting bulges noted above can be produced. Thus, as illustrated in FIG. 10, three core elements or core panels 40, 42 and 44 are provided, each having a structure similar to the core elements 10 and 10', comprised of sheets 12 and 14, welded together along a plurality of parallel seam weld lines 16. It will be noted that the upper and lower core panels 40 and 44 have their weld lines 16 parallel, whereas the center core element 42 is positioned with its weld lines 16 normal to the weld lines of core elements 40 and 44.

The three core elements 40, 42 and 44 are placed together, as illustrated in FIG. 11, and the sheets are joined by being welded around their periphery 46. Gas pressure inlets 48, 50 and 52 are provided for introduction of gas pressure into the top core element 40, the center core element 42 and the bottom core element 44. Gas pressure inlets 54 and 56 are also provided for introduction of gas between the upper and intermediate core elements 40 and 42, and between the bottom and intermediate core elements 44 and 42, respectively. The three core elements 40, 42 and 44 are then joined together by a peripheral weld 58.

Figure 12:
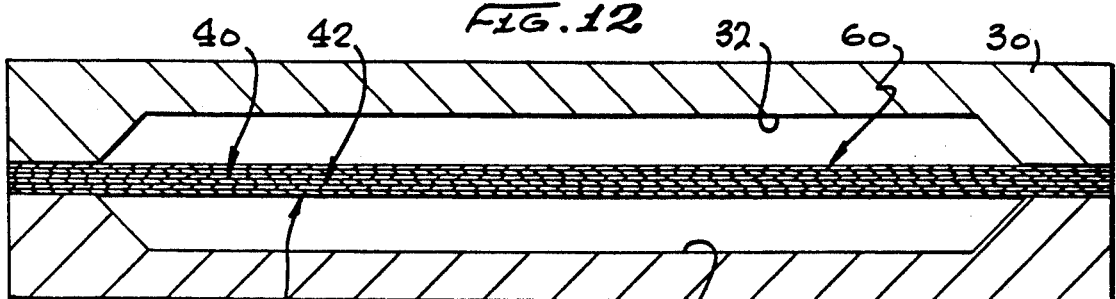
FIG. 12 is a cross section of a die containing the three assembled core elements of FIG. 11.
Figure 13:
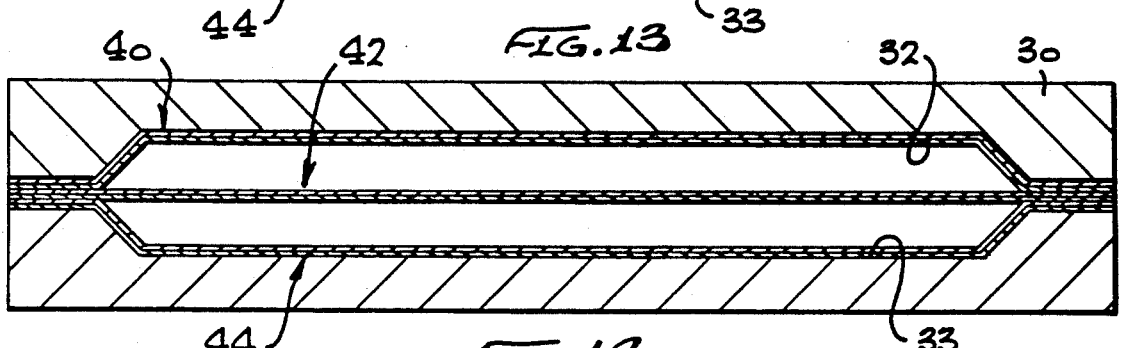
FIG. 13 illustrates application of pressure to cause superplastic forming and expansion of the two outer core elements into contact with the die cavity.

The resulting assembly 60 of joined core elements 40, 42 and 44 is then placed in a heated die 30, as seen in FIG. 12, and gas pressure is introduced through gas inlets 54 and 56 causing superplastic forming and expansion of the two outer core elements 40 and 44 into contact with the die cavity walls 32 and 33, the center core element 42 remaining in its initial position, as seen in FIG. 13.

Figure 14:
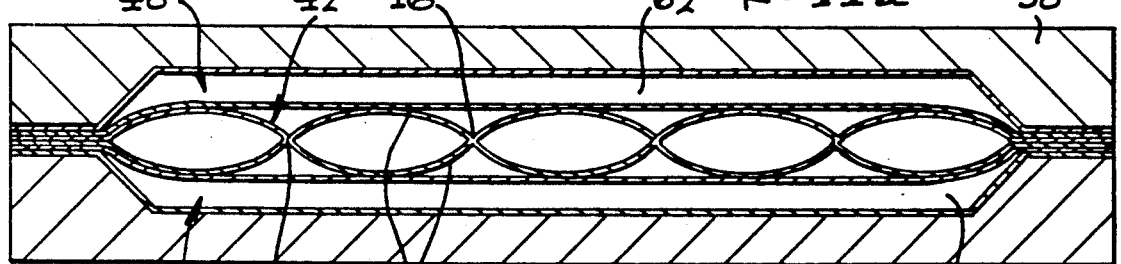
FIG. 14 illustrates application of pressure between the respective sheets of the three core elements of FIG. 13, to form three series of bulges between the weld lines of the three core elements of FIG. 13, the two series of bulges in the outer core elements being parallel and touching the bulges in the central core element, which are normal to the first two series of bulges.
Figure 14A:
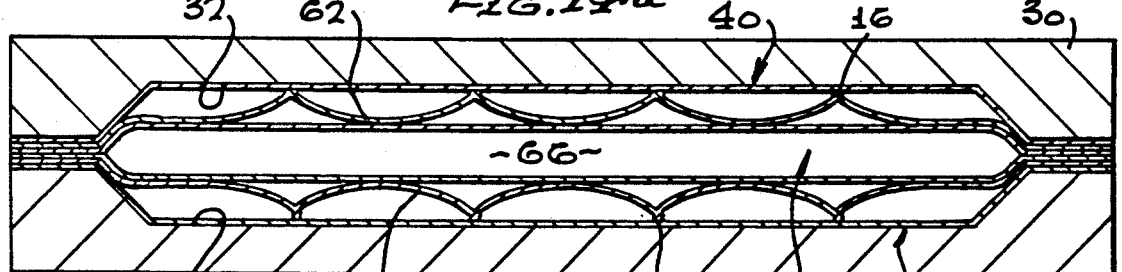
FIG. 14a is a section taken on line 14a—14a of FIG. 14.

Pressure is then applied through gas inlets 48, 50 and 52 between the respective sheets of each of the core elements 40, 42 and 44, causing superplastic forming and expansion of the respective core elements between weld lines 16 of each, to form a series of first bulges 62 between the weld lines 16 of core element 40 and a series of parallel bulges 64 from core element 44, as illustrated in FIG. 14a. At the same time a plurality of double bulges 66 are formed in the center core element 42, normal to the bulges 62 and 64, as seen in FIG. 14, and bulges 66 touch the apex of both bulges 62 and 62. This arrangement is more clearly illustrated in FIG. 16.

Figure 15:
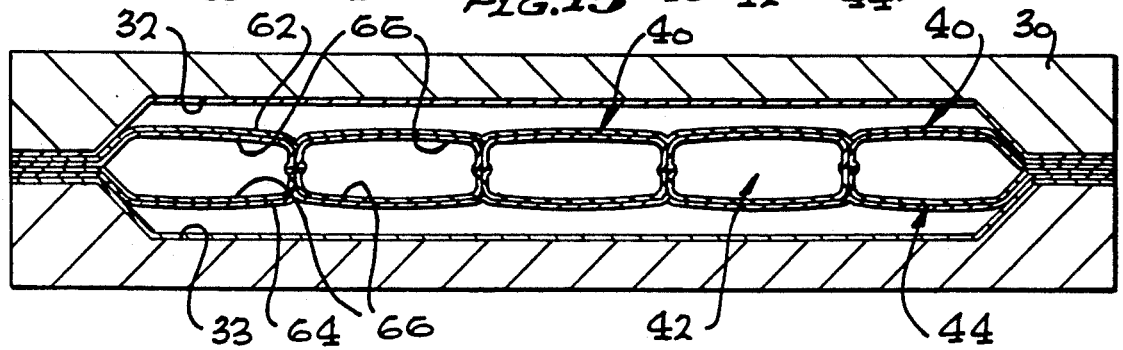
FIG. 15 illustrates formation of the bulges of the central core element around the bulges of the two outer core elements, and diffusion bonding of the contacting bulges.

As pressure is further applied, bulges 62 of the upper core element 40 and bulges 64 of lower core element 44 expand further and continue into contact with the upper and lower portions of bulges 66 of center core element 42, until full contact therewith is made, as illustrated in FIG. 15. Pressure is then increased to cause diffusion bonding of bulges 66 of the center core 42 with the bulges 62 and 64 of the two outer core elements 40 and 44.

Figure 17:
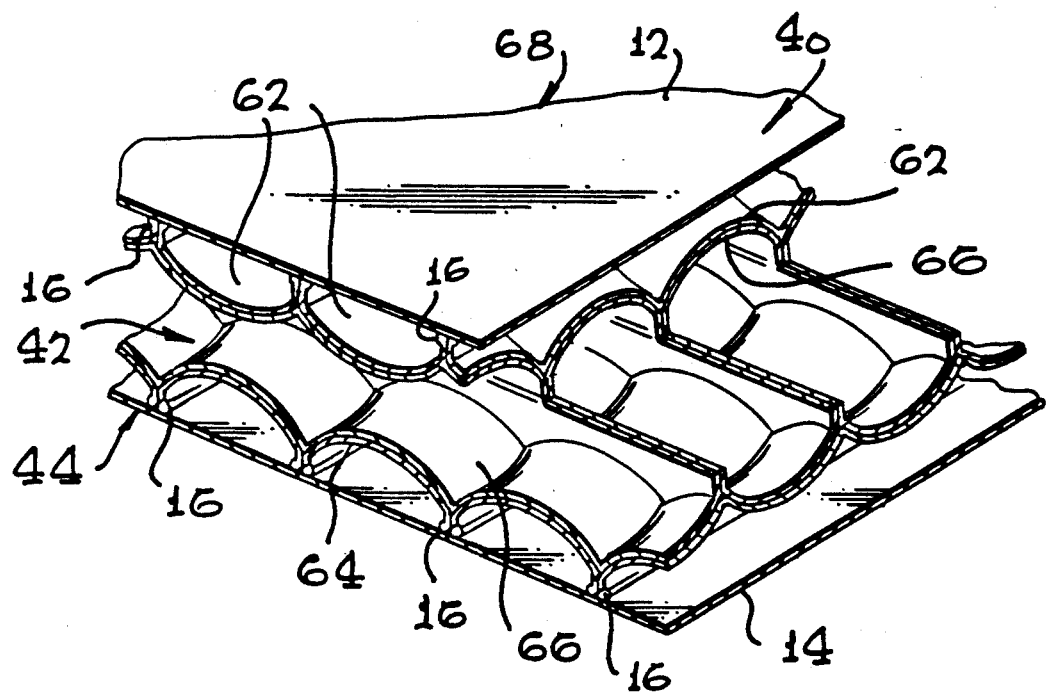
FIG. 17 is an isometric partly broken away cross-section of the final superplastically formed diffusion bonded six-sheet core panel at the stage shown in FIG. 15.

FIG. 17 illustrates the resulting assembly of superplastically formed and diffusion bonded core elements 40, 42 and 44 shown in FIG. 15 to form a six-sheet orthogonal panel 68 formed of the superplastically produced bulges 62, 64 and 66, the outer series of bulges 62 and 64 being parallel, and the center series of bulges 66 being normal to bulges 62 and 64, and wherein the outer face sheets correspond to the sheet 12 of core element 40 and sheet 14 of core element 44. The bulges 62, 64 and 66 extend in length substantially from edge to edge of core elements 40, 44 and 42 respectively.

An eight-sheet panel structure according to the invention is illustrated below, as an extension of the six-sheet panel. Thus, referring to FIG. 18, the same arrangement of core elements or core panels 40, 42 and 44 are made as for the six-sheet embodiment illustrated in FIG. 10. Further, two face sheets 70 and 72 are provided adjacent the two outer core elements 40 and 44, respectively. This arrangement is placed together, as seen at 74 in FIG. 19, and welded around the periphery at 76, leaving gas ports for cavities between cores and face sheets. Thus, gas inlet 78 is provided between top face sheet 70 and top core element 40, gas inlet 79 to the top core element 40, gas inlet 80 to the bottom core element 44, gas inlet 81 to the center core element 42, and gas inlet 82 between bottom face sheet 72 and bottom core element 44. In addition, gas inlet 83 is provided for the cavity between the top and center core elements 40 and 42, and gas inlet 84 for the cavity between the bottom and center core elements 44 and 42.

The assembly 74 is placed in a heated die such as die 30, as in the case of the six-sheet embodiment as shown in FIG. 12. Gas pressure is applied through gas inlets 83 and 84, to the space between the top and center core elements 40 and 42, and to the space between the center and bottom core elements 42 and 44, to superplastically form and expand the outer face sheet 70 and outer core element 40, and outer face sheet 72 and outer core element 44, into contact with the outer walls 32 and 33 of the die cavity, as similarly illustrated in FIG. 13.

Gas pressure is then introduced through gas inlets 78-82, causing superplastic forming and expansion of the areas between weld lines 16 in each of the core elements 40, 42 and 44, to superplastically form and expand until all the bulges, as at 62', 64' and 66, as illustrated in FIGS. 20 and 21 touch. However, in this embodiment, as seen in FIGS. 20 and 21, the two outer series of bulges 62' and 64', as well as center bulges 66, are double bulges, due to the presence of outer face sheets 70 and 72, which remain fixed against the walls 32 and 33 of the die cavity 30 during superplastic forming. This arrangement is more clearly illustrated in FIG. 22.

Superplastic forming and expansion continues until the bulges 64' and 66 of the core elements 44 and 42 make full contact and form around each other, and the bulges 62' and 66 of the core elements 40 and 42 make full contact and form around each other, as similarly illustrated in FIG. 15. Pressure is then increased to diffusion bond the contacting areas of the bulges formed around each other and also to diffusion bond face sheet 70 to bulges 62' and to diffusion bond face sheet 72 to bulges 64'.

Figure 23:
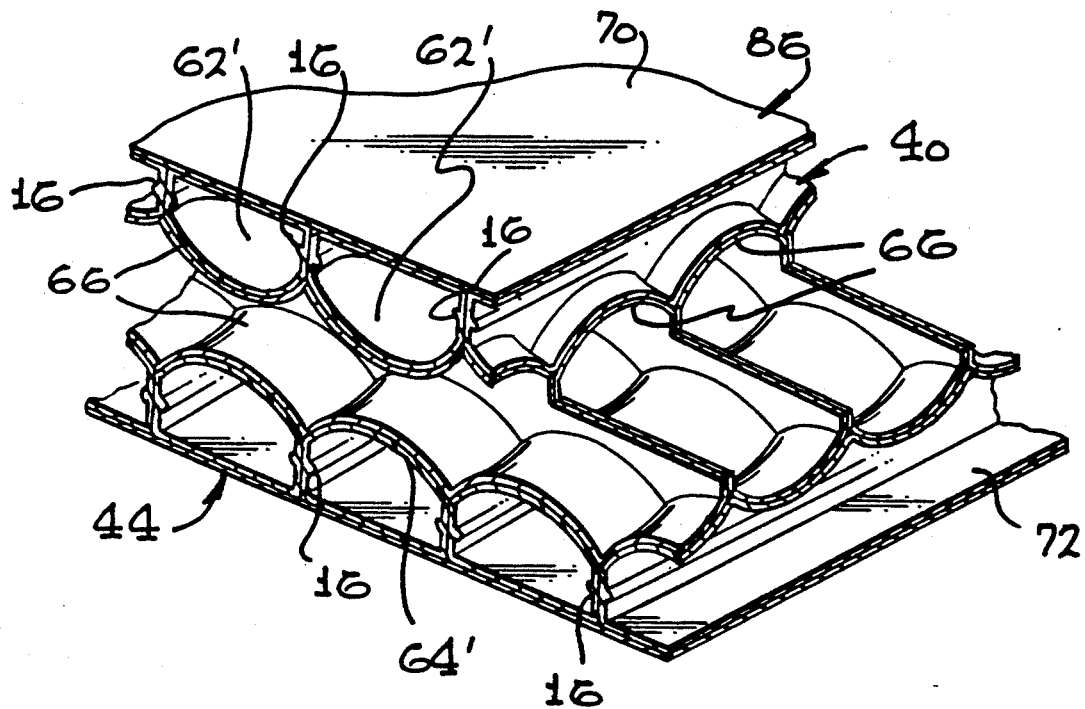
FIG. 23 is an isometric partly broken away cross-section of the final eight-sheet core panel produced by additional superplastic forming and diffusion bonding of the assembly of FIGS. 20 and 21.

The resulting eight-sheet panel structure 86 is illustrated in FIG. 23. This structure is similar to the six-sheet panel shown in FIG. 17 in comprising two outer series of bulges 62' and 64' interconnected to a series of orthogonally positioned or normal center bulges 66. However, in the eight-sheet embodiment, there are separate face sheets 70 and 72 diffusion bonded to the bulges 62' and 64', respectively. Also, viewing FIG. 23, the weldments at 16 between bulges 64' of core element 44, and between bulges 62' of core element 40 are displaced inwardly along the bulges from face sheets 72 and 70, whereas in the six-sheet embodiment shown in FIG. 17, the weldments 16 are at the juncture of the bulges 62 and 64 and the face sheets 12 and 14.

The six-sheet configuration illustrated in FIG. 17 provides extra bending resistance over the four-sheet embodiment illustrated in FIG. 9. The eight-sheet structure illustrated in FIG. 23 has the advantages of the six-sheet configuration and further eliminates the face sheet creasing during fabrication. If desired, more sheets can be employed to provide additional bulges and stiffness, according to the invention concept. More sheets also reduce the degree of forming required to fill deep spaces.

The panel structure of the invention can be employed in any application in which a lightweight stiffened structure is useful, as in components of automotive vehicles and particularly aerospace vehicles.

From the foregoing, it is seen that a novel superplastically formed orthogonal bulge sandwich panel, providing a lightweight stiffened panel structure, and a novel method of fabrication thereof, are provided according to the invention.

Since various changes and modifications of the invention will occur to those skilled in the art within the spirit of the invention, the invention is not to be taken as limited except by the scope of the appended claims.

What is claimed is:

1. A panel structure comprising
  a first core panel comprised of superplastic material, said superplastic material being a metal or a metal alloy having superplasticity characteristics, and including a plurality of successive inwardly extending superplastically formed substantially similar first bulges, and
  at least one other core panel comprised of said superplastic material adjacent said first core panel, and including a plurality of successive inwardly extending superplastically formed substantially similar second bulges orthogonally disposed to and extending toward said first bulges, said second bulges being formed around and contacting said first bulges, and said first and said second bulges being diffusion bonded at the contacting areas.

2. The panel structure of claim 1, including a face sheet connected to said first bulges and a face sheet connected to said second bulges.

3. The panel structure of claim 2, employing a pair of said core panels and forming a four-sheet panel structure.

4. The panel structure of claim 1, each of said core panels formed of a pair of metal sheets, each comprised of said superplastic material, said sheets of each core panel welded together along a plurality of parallel weld lines, the weld lines of said other core panel being disposed normal to the weld lines of said first core panel, the first bulges on said first core panel being formed between adjacent weld lines thereof and the second bulges on said second core panel being formed between adjacent weld lines thereof.

5. The panel structure of claim 4, said weld lines being seam welds.

6. The panel structure of claim 1, said at least one other core panel being a second core panel and including a third core panel comprised of said superplastic material adjacent said second core panel, and including a plurality of successive superplastically formed substantially similar third bulges orthogonally disposed to and extending toward said second bulges, said third bulges being formed around and contacting said second bulges, said first and third bulges being parallel, and said second and third bulges being diffusion bonded at the contacting areas.

7. The panel structure of claim 6, each of said core panels formed of a pair of metal sheets, each comprised of said superplastic material, said sheets of each core panel being welded together along a plurality of parallel weld lines, the weld lines of said first and third core panels being parallel, and the weld lines of said second core panel being disposed normal to the weld lines of said first and third panels, the first bulges on said first core panel being formed between adjacent weld lines thereof, the second bulges on said second core panel being formed between adjacent weld lines thereof, and the third bulges on said third core panel being formed between adjacent weld lines thereof.

8. The panel structure of claim 7, including a first face sheet forming one of the sheets of said first core panel and connected to the first bulges at the weld lines on said first core panel, and a second face sheet forming one of the sheets of said third core panel and connected to said third bulges at the weld lines on said third core panel, and forming a six-sheet panel structure.

9. The panel structure of claim 7, and including a first separate face sheet contiguous to and diffusion bonded to the first bulges on said first core panel and a second separate face sheet contiguous to and diffusion bonded to the third bulges on said third core panel, and forming an eight-sheet panel structure.

* * * * *